(12) United States Patent
Aono et al.

(10) Patent No.: US 12,517,289 B2
(45) Date of Patent: Jan. 6, 2026

(54) METHOD FOR MANUFACTURING CONCAVE DIFFRACTION GRATING, AND OPTICAL DEVICE

(71) Applicant: Hitachi High-Tech Corporation, Tokyo (JP)

(72) Inventors: Takanori Aono, Tokyo (JP); Yoshisada Ebata, Tokyo (JP); Kenta Yaegashi, Tokyo (JP); Shigeru Matsui, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 513 days.

(21) Appl. No.: 18/008,628

(22) PCT Filed: Feb. 25, 2021

(86) PCT No.: PCT/JP2021/007037
§ 371 (c)(1),
(2) Date: Dec. 6, 2022

(87) PCT Pub. No.: WO2021/256009
PCT Pub. Date: Dec. 23, 2021

(65) Prior Publication Data
US 2023/0236345 A1   Jul. 27, 2023

(30) Foreign Application Priority Data
Jun. 16, 2020  (JP) ................................ 2020-103791

(51) Int. Cl.
*G02B 5/18*  (2006.01)
(52) U.S. Cl.
CPC .................................. *G02B 5/1857* (2013.01)

(58) Field of Classification Search
CPC .. G02B 5/1861; G02B 5/1857; G02B 5/1852; B29C 59/021; G01J 3/18
See application file for complete search history.

(56) References Cited

U.S. PATENT DOCUMENTS

| | | | |
|---|---|---|---|
| 2013/0170218 A1* | 7/2013 | Wolk ..................... | G02B 6/005 362/296.01 |
| 2014/0042426 A1* | 2/2014 | Nishimura ........... | H10K 59/879 362/335 |

(Continued)

FOREIGN PATENT DOCUMENTS

| | | |
|---|---|---|
| EP | 3 819 684 A1 | 5/2021 |
| EP | 4 109 145 A1 | 12/2022 |

(Continued)

OTHER PUBLICATIONS

International Search Report (PCT/ISA/210) issued in PCT Application No. PCT/JP2021/007037 dated May 18, 2021 with English translation (five (5) pages).

(Continued)

*Primary Examiner* — Jonathan Y Jung
(74) *Attorney, Agent, or Firm* — Crowell & Moring LLP

(57) ABSTRACT

Provided is a feature for highly precisely manufacturing a concave diffraction grating that has a uniform diffraction grating pattern. This method for manufacturing a concave diffraction grating includes: preparing a flat diffraction grating that has a lattice groove and that also has an elongated section, a thin-film section, or a low-friction section formed outside of a region for forming a mold for the concave diffraction grating; mounting the flat diffraction grating on a convex substrate and acquiring the mold for the concave diffraction grating; and transferring the lattice groove in the mold to the concave substrate.

7 Claims, 7 Drawing Sheets

(56) References Cited

U.S. PATENT DOCUMENTS

2016/0141528 A1* 5/2016 Masuyama ............ H10K 77/10
                                                              257/40
2016/0282526 A1* 9/2016 Aono .................... B29C 59/021

FOREIGN PATENT DOCUMENTS

| JP | 8-29610 A | | 2/1996 |
|----|-----------|---|--------|
| JP | 2012203229 A | * | 10/2012 |
| JP | 2014-134568 A | | 7/2014 |
| JP | 2014-182301 A | | 9/2014 |
| WO | WO 2020/009222 A1 | | 1/2020 |
| WO | WO 2020/044658 A1 | | 3/2020 |

OTHER PUBLICATIONS

Japanese-language Written Opinion (PCT/ISA/237) issued in PCT Application No. PCT/JP2021/007037 dated May 18, 2021 (three (3) pages).
Extended European Search Report issued in European Application No. 21824755.9 dated Jun. 12, 2024 (7 pages).

* cited by examiner

METHOD FOR MANUFACTURING CONCAVE DIFFRACTION GRATING, AND OPTICAL DEVICE

TECHNICAL FIELD

The present disclosure relates to a method for manufacturing a concave diffraction grating, and an optical device.

BACKGROUND ART

Concave diffraction grating, which is an optical element of spectrophotometer having both of light-dispersing and light-converging performances, can reduce the number of components, and can therefore simplify the device structure.

Prior concave diffraction grating has been manufactured by producing a die for diffraction grating by engraving grating grooves on the convex substrate with use of a machine such as ruling engine, and then imprinting the engraved grating grooves onto resin, metal or the like.

A method for manufacturing such concave diffraction grating is described in PTL 1, stating "a method for manufacturing a concave blazed diffraction grating, by which ion beam is irradiated on a substrate with a concave surface having formed thereon a grating photoresist pattern, to form a grating groove pattern with a serrate cross section on the concave surface, the ion beam being irradiated radially from one point-like or linear origin, and the substrate being arranged so as to locate itself within a radiation range of the ion beam, and so as to form an acute angle between a normal vector at any point on the concave surface, and a vector directed from that point towards the origin" (see claim 1 of PTL 1).

PTL 2 describes "a method for manufacturing a curved diffraction grating, the method comprising stacking a replica layer of a flat diffraction grating on a flexible substrate, and allowing the replica layer to bend together with the substrate, as a result of cure shrinkage of the replica layer, and each of materials and dimensions of the substrate and the replica layer being combined so that the replica layer will bent together with the substrate into a predetermined curved shape" (see claim 4 of PTL 2).

PTL 3 describes "obtaining a curved diffraction grating that contains a crystalline material in which dislocation line is suppressed from occurring, by imprinting a silicone flat diffraction grating manufactured by a semiconductor process onto an amorphous material, bending the amorphous material substrate, and then by mounting it onto a curved fixation substrate" (see Abstract of PTL 3).

CITATION LIST

Patent Literature

PTL 1: JP 2014-134568 A
PTL 2: JP H08-29610 A
PTL 3: JP 2014-182301 A

SUMMARY OF INVENTION

Technical Problem

Manufacture of a die for the diffraction grating, by the aforementioned mechanical engraving typically with use of a ruling engine, has however posed an issue of inconsistent blaze angle due to a constant angle of an engraving tool, resulting in formation of shallow and deep parts in serrate grating pattern, at the center and edge parts of the curved substrate.

The method for manufacturing a concave diffraction grating based on the semiconductor process, disclosed in PTL 1, suffers from difficulty of precisely forming the grating groove in the resist by photolithography on any curved substrate. Meanwhile, ion etching on the curved surface tends to cause shape variation of the grating groove.

The technique of manufacturing the die for the curved diffraction grating, described in PTL 2, suffers from degraded pattern accuracy when imprinted onto the concave diffraction grating, since a flexible member is used for forming the grating groove on the curved surface. In particular, the manufacture that relies upon imprinting of the grating groove to a flexible material such as a silicone resin, fixing onto a curved substrate to form a die for the concave diffraction grating, and imprinting onto the concave diffraction grating, would collapse the pattern of the die formed of the flexible material, due to tension applied during imprinting and separation of the concave diffraction grating, thus shortening the service life.

In PTL 3, the manufacture of the die for a concave diffraction grating, having large area or small curvature, has posed issues of influence of wrinkling on a region where the grating will be formed, and fracture of the grating.

It is therefore an object of the present disclosure to provide a technique for precisely manufacturing a concave diffraction grating having a uniform diffraction grating pattern.

Solution to Problem

Aimed at solving the aforementioned issues, a method for manufacturing a concave diffraction grating according to the present disclosure includes:

preparing a flat diffraction grating that has a grating groove, and has a stretchable part, a thin film part, or a low-friction part formed outside a region that serves as a die for the concave diffraction grating;

mounting the flat diffraction grating on a convex substrate to acquire the die for the concave diffraction grating; and imprinting the grating groove of the die onto a concave substrate.

Further features related to the present disclosure will become apparent from the description of the present specification and the accompanying drawings. In addition, the aspects of the present disclosure are achieved and realized by elements, combinations of various elements, the following detailed description, and aspects of the appended claims.

The description of the present specification is merely exemplary, and does not limit the scope of claims or application examples of the present disclosure in any sense.

Advantageous Effects of Invention

The present disclosure makes it possible to precisely manufacture a concave diffraction grating having a uniform diffraction grating pattern.

Problems, structures, and effects other than those described above will be clarified by the following description of embodiments.

DESCRIPTION OF EMBODIMENTS

First Embodiment

<Exemplary Structure of Optical Device>

Figure 1:
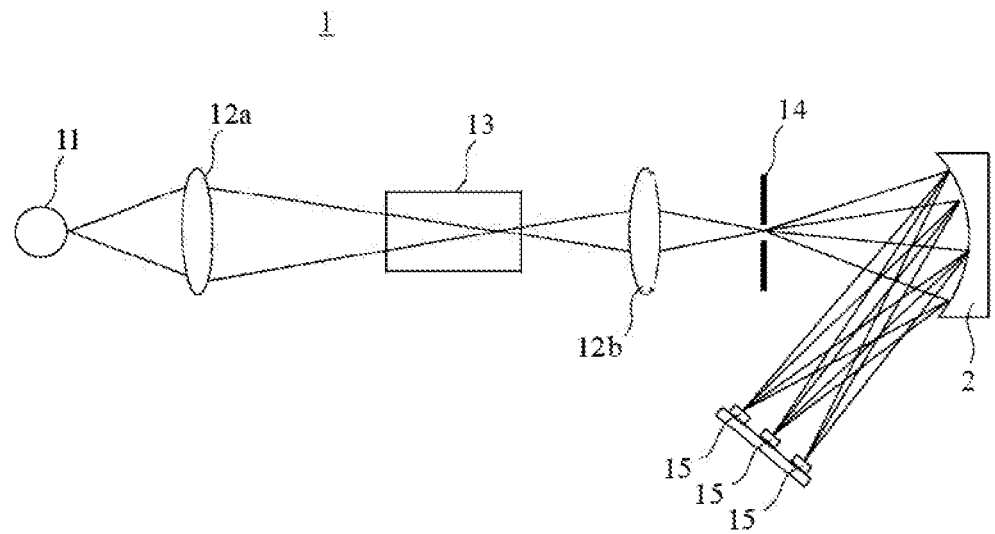
FIG. 1 is a schematic view illustrating an optical device according to a first embodiment.

FIG. 1 is a schematic view illustrating an optical device 1 according to the first embodiment. The optical device 1 is typically a spectrophotometer, which can selectively absorb light whose wavelength is inherent to chemical bond in substance such as chemical substance or biological substance, and may be used for measuring the concentration or identifying the substance. As illustrated in FIG. 1, the optical device 1 has a concave diffraction grating 2, a white light source 11, condenser lenses 12a and 12b, a sample chamber 13, a slit 14, and a plurality of detectors 15.

The light from the white light source 11 is condensed by the condenser lens 12a, and irradiated on an object to be measured placed in the sample chamber 13. The light having transmitted through the sample chamber 13 is condensed by the condenser lens 12b on an opening of the slit 14. The light having passed through the slit 14 is chromatically dispersed on the concave diffraction grating 2, to form a spectrum. The plurality of detectors 15 are linearly arranged, and detect the spectrum created by the concave diffraction grating 2.

Figure 2:
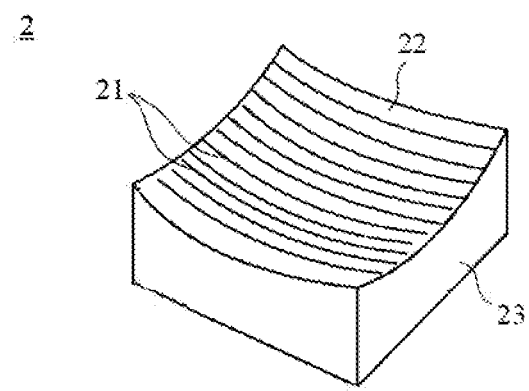
FIG. 2 is a schematic perspective view of a concave diffraction grating.

FIG. 2 is a schematic perspective view of the concave diffraction grating 2. As illustrated in FIG. 2, the concave diffraction grating 2 is structured to have a concave substrate 23, on which a reflective film 22 with a grating groove 21 is arranged. Material usable herein for composing the reflective film 22 is exemplified by highly reflective metal material, which may be particularly aluminum or gold. A method for manufacturing the concave diffraction grating 2 will be described later.

<Exemplary Structure of Metal Flat Diffraction Grating>

Figure 3:
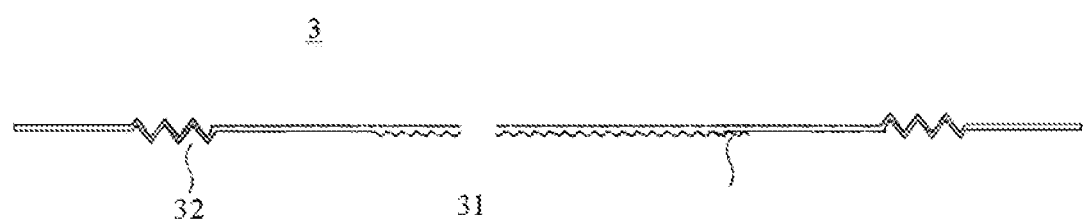
FIG. 3 is a schematic cross sectional view illustrating a metal flat diffraction grating according to the first embodiment.

FIG. 3 is a schematic cross-sectional view illustrating a metal flat diffraction grating 3 used for manufacturing a die for the concave diffraction grating 2. As illustrated in FIG. 3, the metal flat diffraction grating 3 has a grating groove 31 and a stretchable part 32. The grating groove 31 is a diffraction grating pattern serrated at a predetermined angle (blaze angle), formed at the center of one face of the metal flat diffraction grating 3. The grating groove 31 may be fabricated typically by imprinting the flat diffraction grating. Moreover, the grating groove 31 may alternatively be fabricated by forming a diffraction grating pattern on a flat substrate, typically by photolithography, or by photolithography combined with etching, or by machining.

The stretchable part 32 is formed in a bellows shape, outside a region of the grating groove 31 (outside a region that serves as a die for the concave diffraction grating 2), and is stretchable in the direction along the face of a concave substrate 43. The stretchable part 32 may be formed typically by pressing the metal flat diffraction grating 3 from both sides.

The material for composing the metal flat diffraction grating 3, for which although metal is used in the present embodiment, is not limited to metal as long as it is heat resistant and ductile.

<Method for Manufacturing Die for Concave Diffraction Grating>

FIGS. 4(a) to 4(d) are schematic cross sectional views illustrating a method for manufacturing a die 4 for the concave diffraction grating 2. Briefing this method, the die 4 for the concave diffraction grating 2 is manufactured by deforming and bonding the metal flat diffraction grating 3 on a convex substrate 41.

Figure 4A:
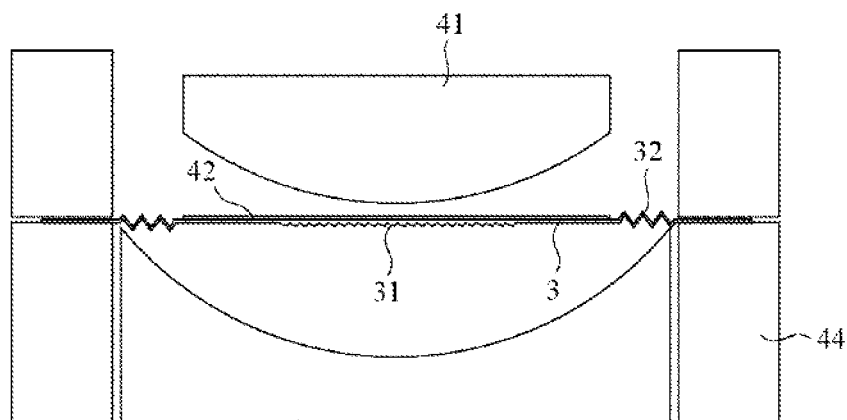
FIGS. 4A to 4D are schematic cross sectional views illustrating a method for manufacturing a die for the concave diffraction grating according to the first embodiment.

First, as illustrated in FIG. 4(a), an adhesive 42 is applied to the metal flat diffraction grating 3 on the surface thereof opposite to the surface on which the grating groove 31 is formed, and the metal flat diffraction grating 3 is placed between the convex substrate 41 and a concave substrate 43. The end of the metal flat diffraction grating 3 is fixed by a jig 44.

Figure 4B:
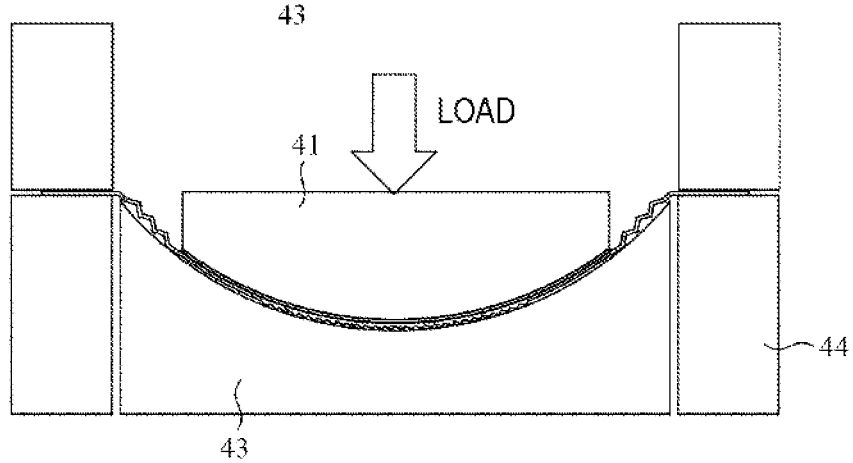

Next, as illustrated in FIG. 4(b), load is applied to the convex substrate 41 to deform the metal flat diffraction grating 3, and to mount the metal flat diffraction grating 3 on the convex substrate 41. Stretching of the stretchable part 32 now successfully prevents the outer peripheral part of the metal flat diffraction grating 3 from wrinkling, and increases the amount of deformation of the metal flat diffraction grating 3. Moreover, since the surface of the metal flat diffraction grating 3 on which the grating groove 31 is formed to fit the concave substrate 43, the die 4 for the concave diffraction grating 2 may be manufactured according to the surface accuracy of the concave substrate 43, without being affected by variations in film thickness of the metal flat diffraction grating 3 or in film thickness of the adhesive 42.

Figure 4C:
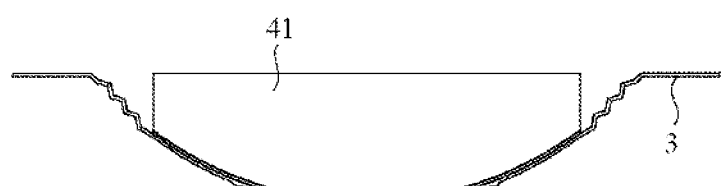

Next, as illustrated in FIG. 4(c), the metal flat diffraction grating 3 is detached from the concave substrate 43 and the jig 44.

Figure 4D:
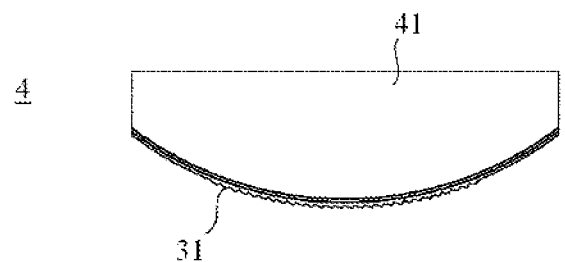

Lastly, as illustrated in FIG. 4(d), the outer peripheral part of the metal flat diffraction grating 3 (region that will not serve as the die 4) is removed, to form the die 4 for the concave diffraction grating 2.

<Method for Manufacturing Concave Diffraction Grating>

FIGS. 5(a) to 5(d) are schematic cross sectional views illustrating a method for manufacturing the concave diffraction grating 2.

Figure 5A:
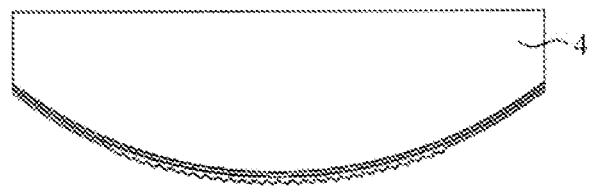
FIGS. 5A to 5D are schematic cross sectional views illustrating a method for manufacturing the concave diffraction grating.

First, as illustrated in FIG. 5(a), the die 4 for the concave diffraction grating 2 manufactured as described above is prepared.

Figure 5B:
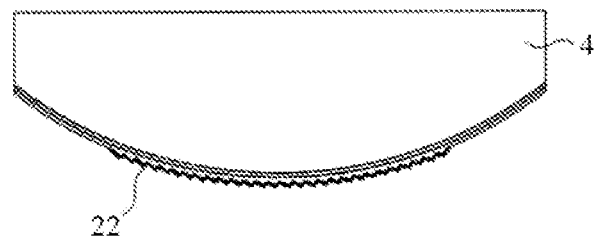

Next, as illustrated in FIG. 5(b), a release layer (not illustrated) is formed on the convex face of the die 4, and the reflective film 22 is then formed on the release layer.

Figure 5C:
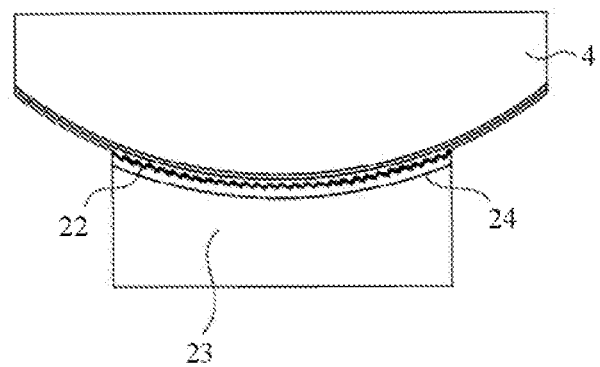

Next, as illustrated in FIG. 5(c), an adhesive 24 is applied onto the reflective film 22, and the concave substrate 23 is set.

Figure 5D:
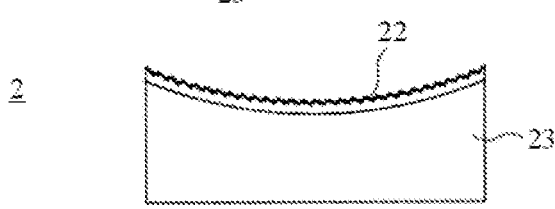

Upon curing of the adhesive 24, the die 4 is detached as illustrated in FIG. 5(d), to acquire the concave diffraction grating 2.

Note that the concave diffraction grating 2 may alternatively be manufactured by imprinting the grating groove on a resin by a technique such as nanoimprinting, with use of the die 4 for the concave diffraction grating 2, and by forming the reflective film 22 on the surface thereof.

SUMMARY

As described above, the method for manufacturing the concave diffraction grating 2 according to the first embodiment includes:

preparing the metal flat diffraction grating 3 (flat diffraction grating) that has the grating groove 31, and has the stretchable part 32 formed outside a region that serves as the die 4 for the concave diffraction grating 2;

mounting the metal flat diffraction grating 3 on the convex substrate 41 to acquire the die 4 for the concave diffraction grating 2; and imprinting the die 4 onto the concave substrate 23. Since the stretchable part 32 stretches when the metal flat diffraction grating 3 is mounted on the convex substrate 41, the metal flat diffraction grating 3 may be largely deformed while being suppressed from wrinkling. This simplifies manufacture of the concave diffraction grating having large area or small curvature.

Moreover, since the grating groove 31 of the metal flat diffraction grating 3 is serrated at a specific angle (blaze angle), and also since such flat diffraction grating is mounted on the convex substrate 41, the die 4 may be manufactured while shape variation of the grating groove 31 is suppressed over the entire surface of the convex substrate 41. With use of the die 4, it now becomes possible to manufacture a concave diffraction grating having a diffraction grating pattern serrated at a specific angle (blaze angle). Equipping the optical device with such concave diffraction grating can improve the diffraction efficiency, and can reduce the stray light (noise).

As described above, the concave diffraction grating 2 manufactured by the method of the present embodiment has a uniform blaze angle. In addition, since the die 4 is formed by placing the metal flat diffraction grating 3 conforming to the convex substrate 41 (curved surface), the concave diffraction grating 2, to which the die 4 is imprinted, will have a blazed face slightly curved (approximately 1%, for example). In contrast, the concave diffraction grating manufactured by the method of PTL 1 has a flat blazed face. The concave diffraction grating manufactured by the method of PTL 2 would deform when the replica layer is formed, and is considered to have poor uniformity of the grating groove. The die for the concave diffraction grating in PTL 3 is affected, during the manufacture, by wrinkling which occurs at a region where the diffraction grating is formed, making it difficult to manufacture the concave diffraction grating having large area or small curvature, as compared with the method for manufacturing the concave diffraction grating according to the present embodiment.

Second Embodiment

The first embodiment has explained a technique by which the metal flat diffraction grating may be suppressed from wrinkling when mounted on the convex substrate, as a result of provision of the stretchable part to increase the amount of deformation. The second embodiment proposes a technique of reducing the influence of wrinkling, by increasing the rigidity of the region where the grating groove will be formed. Note that all constitutions similar to those in the first embodiment will be denoted by similar reference signs, to skip the explanation therefor.

<Exemplary Structure of Metal Flat Diffraction Grating>

Figure 6:
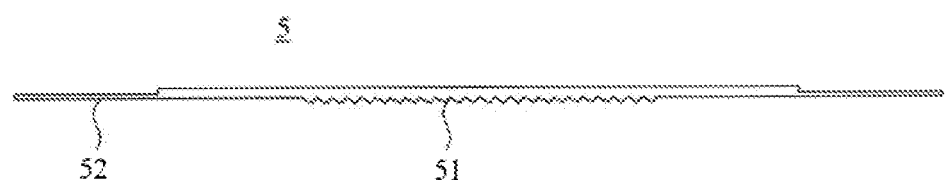
FIG. 6 is a schematic cross sectional view illustrating a metal flat diffraction grating according to a second embodiment.

FIG. 6 is a schematic cross sectional view illustrating a metal flat diffraction grating 5 according to the second embodiment. As illustrated in FIG. 6, the metal flat diffraction grating 5 has a grating groove 51 and a thin film part 52. The thin film part 52 is formed at the end (outer peripheral portion) of the metal flat diffraction grating 5 and outside the region of the grating groove 51 (outside the region that serves as a die for the concave diffraction grating 2).

Figure 7A:
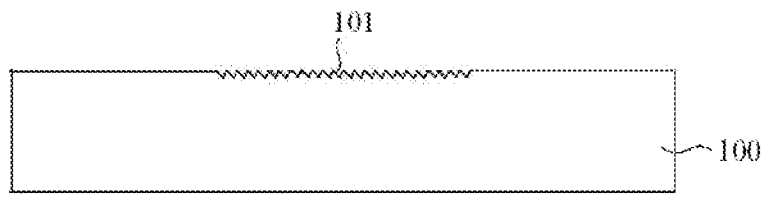
FIGS. 7A to 7E are schematic cross sectional views illustrating a method for manufacturing a metal flat diffraction grating according to the second embodiment.

FIGS. 7(a) to 7(e) are schematic cross sectional views illustrating a method for manufacturing the metal flat diffraction grating 5. First, as illustrated in FIG. 7(a), a diffraction grating pattern 101 is formed on the surface of a flat substrate 100, typically by photolithography, or by photolithography combined with etching, or by machining.

Figure 7B:
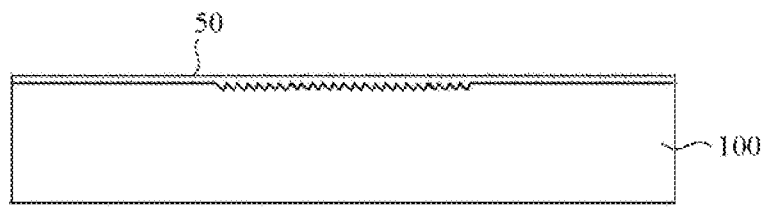

Next, as illustrated in FIG. 7(b), an electrolytic plating 50 is applied on the flat substrate 100.

Figure 7C:
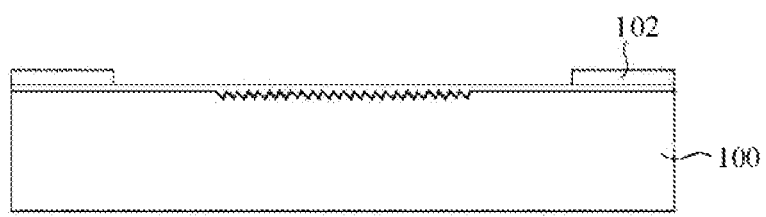

Next, as illustrated in FIG. 7(c), a mask 102 is formed on the outer peripheral part on the top face of the electrolytic plating 50 by photolithography.

Figure 7D:
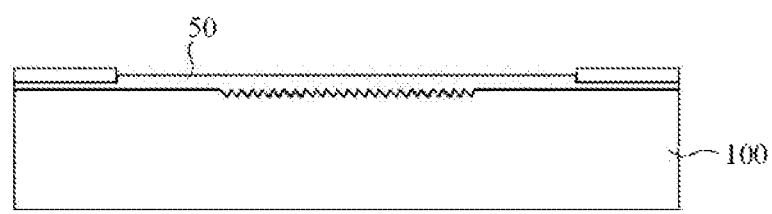

Next, as illustrated in FIG. 7(d), the electrolytic plating 50 is additionally applied to a part where the electrolytic plating 50 exposed.

Figure 7E:

Lastly, as illustrated in FIG. 7(e), the flat substrate 100 and the mask 102 are removed.

<Method for Manufacturing Die for Concave Diffraction Grating>

FIGS. 8(a) to 8(d) are schematic cross sectional views illustrating a method for manufacturing a die 6 for the concave diffraction grating 2.

Figure 8A:
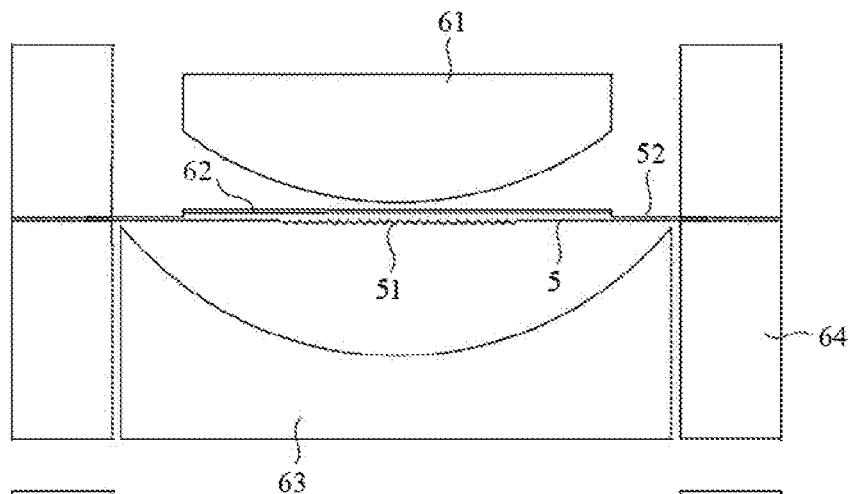
FIGS. 8A to 8D are schematic cross sectional views illustrating a method for manufacturing a die for a concave diffraction grating according to the second embodiment.

First, as illustrated in FIG. 8(a), an adhesive sheet 62 is bonded to the metal flat diffraction grating 5, on the surface thereof opposite to the surface on which the grating groove 51 is formed, and the metal flat diffraction grating 5 is placed between a convex substrate 61 and a concave substrate 63. The end of the metal flat diffraction grating 5 is fixed by a jig 64.

Figure 8B:
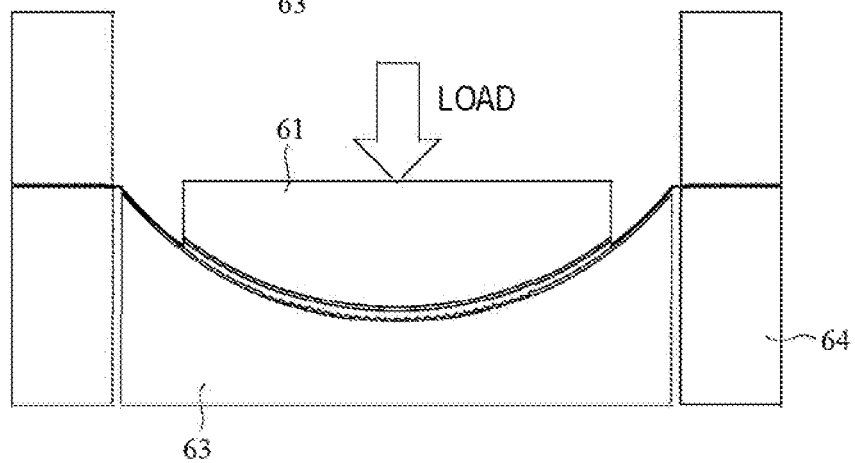

Next, as illustrated in FIG. 8(b), load is applied to the convex substrate 61 to deform the metal flat diffraction grating 5, to mount the metal flat diffraction grating 5 on the convex substrate 61. Now the thin film part 52 might cause a wrinkle, but the wrinkle does not adversely affect the part where the grating groove 51 will be formed (region which will serve as a die 6), since such part for forming the grating groove 51 is highly rigid. Also since the surface of the metal flat diffraction grating 5, on which the grating groove 51 is formed, conforms to the concave substrate 63, the die 6 for the concave diffraction grating 2 may be manufactured according to the surface accuracy of the concave substrate 63, without being affected by variations in film thickness of the metal flat diffraction grating 5 or in film thickness of the adhesive sheet 62.

Figure 8C:
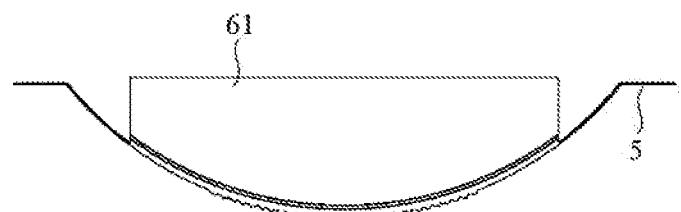

Next, as illustrated in FIG. 8(c), the metal flat diffraction grating 5 is detached from the concave substrate 63 and the jig 64.

Figure 8D:
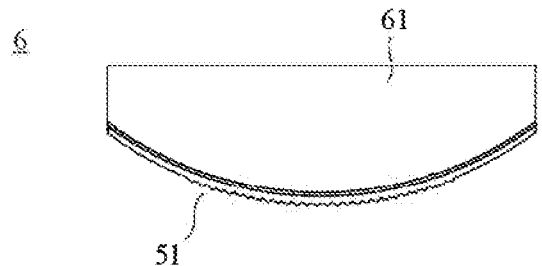

Lastly, as illustrated in FIG. 8(d), the outer peripheral part of the metal flat diffraction grating 5 is removed to form the die 6 for the concave diffraction grating 2.

<Method for Manufacturing Concave Diffraction Grating>

The method for manufacturing the concave diffraction grating 2 is same as that of the first embodiment, except that the thus obtained die 6 is used.

SUMMARY

As described above, the method for manufacturing the concave diffraction grating 2 according to the second embodiment includes:
- preparing the flat diffraction grating 5 (flat diffraction grating) that has the grating groove 51, and has the thin film part 52 formed outside a region that serves as the die 6 for the concave diffraction grating 2; and
- mounting the flat diffraction grating 5 on the convex substrate 61 to acquire the die 6 for the concave diffraction grating 2. Hence, even if the thin film part 52 wrinkles when the metal flat diffraction grating 5 is mounted on the convex substrate 61, the grating groove 51 will not be affected since the region for the grating groove 51 is highly rigid. This enables manufacture of the concave diffraction grating having large area or small curvature. Moreover, since the influence of wrinkle on the grating groove 51 may be reduced, the diffraction grating pattern may have suppressed shape variation.

Third Embodiment

The third embodiment proposes another structure that suppresses wrinkling of the metal flat diffraction grating when mounted on the convex substrate.

<Exemplary Structure of Metal Flat Diffraction Grating>

Figure 9:
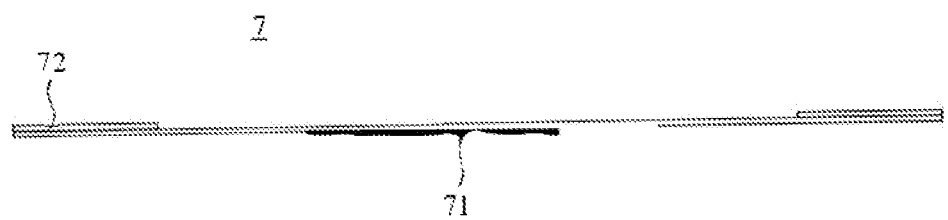
FIG. 9 is a schematic cross sectional view illustrating a metal flat diffraction grating according to a third embodiment.

FIG. 9 is a schematic cross sectional view illustrating a metal flat diffraction grating 7 according to the third embodiment. As illustrated in FIG. 9, the metal flat diffraction grating 7 has a grating groove 71, and a material 72 having a small sliding friction in a part of the metal flat diffraction grating 7.

The material 72 is arranged at the end (outer peripheral part) of the metal flat diffraction grating 7, on the surface thereof opposite to the surface on which the grating groove 71 is formed, and outside a region of the grating groove 71 (region that will not serve as a die for the concave diffraction grating 2). The material 72 may be bonded to the metal flat diffraction grating 7, typically with use of an adhesive sheet. The material 72 used here may be a resin material that is not softened at the softening temperature of the adhesive, such as PET resin, or PTFE resin. Of course, the material 72 is not limited to the resin material as long as it has the sliding frictional force smaller than that of the metal flat diffraction grating 7, and is heat resistant.

<Method for Manufacturing Die for Concave Diffraction Grating>

FIGS. 10(a) to 10(d) are schematic cross sectional views illustrating a method for manufacturing a die 8 for the concave diffraction grating 2.

Figure 10A:
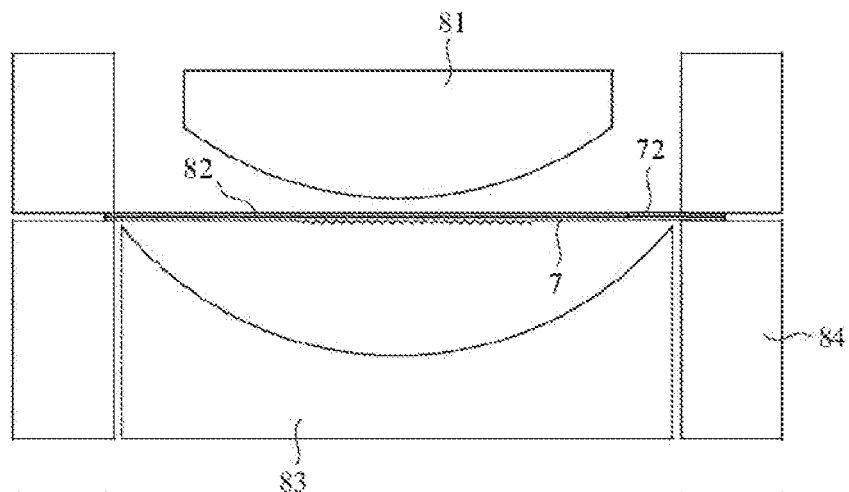
FIGS. 10A to 10D are schematic cross sectional views illustrating a method for manufacturing a die for a concave diffraction grating according to the third embodiment.

First, as illustrated in FIG. 10(a), an adhesive 82 is applied to the metal flat diffraction grating 7 on the surface thereof opposite to the surface on which the grating groove 71 is formed, and the metal flat diffraction grating 7 is placed between the convex substrate 81 and a concave substrate 83. The end of the metal flat diffraction grating 7 is fixed by a jig 84.

Figure 10B:
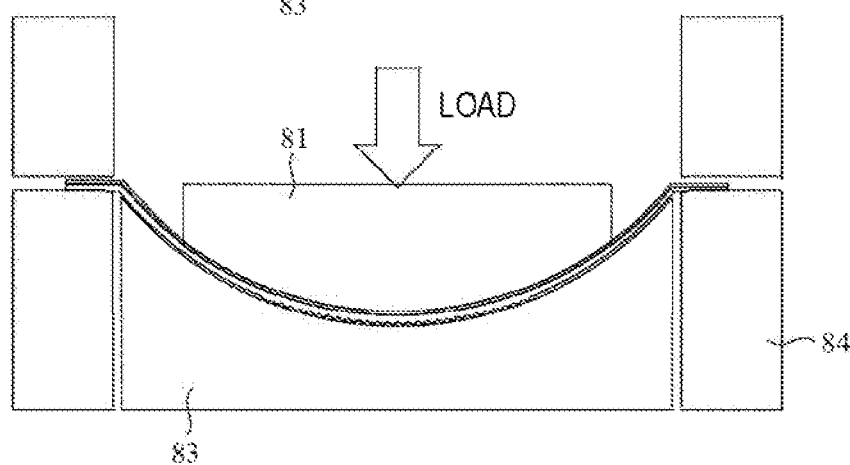

Next, as illustrated in FIG. 10(b), load is applied to the convex substrate 81 to deform the metal flat diffraction grating 7, and to mount the metal flat diffraction grating 7 on the convex substrate 81. Now, the material 72 having small sliding friction slides on the fixed jig 84, making it possible to suppress the metal flat diffraction grating 7 from wrinkling. Moreover, since the surface of the metal flat diffraction grating 7, on which the grating groove 71 is formed, conforms to the concave substrate 83, the die 8 for the concave diffraction grating may be manufactured according to the surface accuracy of the concave substrate 83, without being affected by variations in film thickness of the metal flat diffraction grating 7 or in film thickness of the adhesive 82.

Figure 10C:
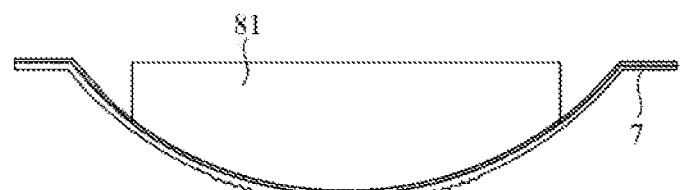

Next, as illustrated in FIG. 10(c), the metal flat diffraction grating 7 is detached from the concave substrate 83 and the jig 84.

Figure 10D:
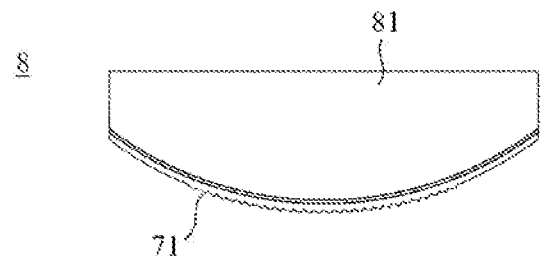

Lastly, as illustrated in FIG. 10(d), the outer peripheral part of the metal flat diffraction grating 7 is removed to form the die 8 for the concave diffraction grating 2.

<Method for Manufacturing Concave Diffraction Grating>

The method for manufacturing the concave diffraction grating 2 is same as that in the first embodiment, except that the thus obtained die 8 is used.

SUMMARY

As described above, the method for manufacturing the concave diffraction grating 2 according to the third embodiment includes:
- preparing the metal flat diffraction grating 7 (flat diffraction grating) that has the grating groove 71, and has the material 72 having small sliding friction (low-friction part) formed outside a region that serves as the die 8 for the concave diffraction grating 2; and mounting the metal flat diffraction grating 7 on the convex substrate 81 to acquire the die 8 for the concave diffraction grating 2. Since the material 72 can slide on the fixing jig 84, the metal flat diffraction grating 7 may be suppressed from wrinkling when mounted on the convex substrate 81. This enables manufacture of the concave diffraction grating having large area or small curvature.

Moreover, since the metal flat diffraction grating 7 may be suppressed from wrinkling, and since the grating groove 51 is serrated at a specific angle, the diffraction grating pattern may be suppressed from causing shape variation.

Modified Example

The present disclosure includes various modifications, without being limited to the aforementioned embodiments. For example, the above-described embodiments have been detailed for easy understanding of the present disclosure, and do not necessarily contain all of the aforementioned structures. A part of one embodiment may be replaced with a structure of another embodiment. A structure of another embodiment may be added to a structure of certain embodiment. Moreover, a part of a structure of another embodiment may be added to, deleted from, or replaced with, a part of the structure of each embodiment.

REFERENCE SIGNS LIST 1 optical device
2 concave diffraction grating
3, 5, 7 metal flat diffraction grating
4, 6, 8 die
11 white light source
12a, 12b condenser lens
13 sample chamber 14 slit
15 detector
21 grating groove
22 reflective film
23 concave substrate
24 adhesive
31, 51, 71 grating groove
32 stretchable part
41, 61, 81 convex substrate
42, 82 adhesive
62 adhesive sheet
43, 63, 83 concave substrate
44, 64, 84 jig
52 thin film part
72 material with small coefficient of sliding friction

The invention claimed is:

1. A method for manufacturing a concave diffraction grating, the method comprising:
preparing a flat diffraction grating that has a grating groove, and has a stretchable part, a thin film part, or a low-friction part formed outside a region that serves as a die for the concave diffraction grating;
mounting the flat diffraction grating on a convex substrate to acquire the die for the concave diffraction grating; and
imprinting the grating groove of the die onto a concave substrate;
wherein the region that serves as a die for the concave diffraction grating has a coefficient of friction smaller than that of a region outside the region that serves as a die for the concave diffraction grating,
the low-friction part is formed at the end of the flat diffraction grating, and
when the flat diffraction grating is mounted on the convex substrate, the convex substrate is pressed against the flat diffraction grating, with at least a part of the low friction part fixed.

2. The method for manufacturing a concave diffraction grating according to claim 1, wherein when the flat diffraction grating is mounted on the convex substrate, the convex substrate is pressed against the flat diffraction grating, with the flat diffraction grating fixed at an end thereof outside a region of the stretchable part,
thus making the stretchable part stretched.

3. The method for manufacturing a concave diffraction grating according to claim 1, wherein the thin film part is formed at the end of the flat diffraction grating, and
when the flat diffraction grating is mounted on the convex substrate, the convex substrate is pressed against the flat diffraction grating, with at least a part of the thin film part fixed.

4. The method for manufacturing a concave diffraction grating according to claim 1, wherein the flat diffraction grating is formed of a metal material.

5. The method for manufacturing a concave diffraction grating according to claim 1, wherein the stretchable part has a shape of bellows.

6. The method for manufacturing a concave diffraction grating according to claim 1,
wherein acquisition of the die for the concave diffraction grating further comprising:
removing, after mounting the flat diffraction grating onto the convex substrate, a region of the flat diffraction grating, other than a region that serves as the die for the concave diffraction grating.

7. An optical device comprising a concave diffraction grating manufactured by the method for manufacturing a concave diffraction grating described in claim 1.

* * * * *